(12) United States Patent
Nuydens

(10) Patent No.: US 8,736,599 B2
(45) Date of Patent: May 27, 2014

(54) METHOD FOR UNIFIED VISUALISATION OF HETEROGENEOUS DATASETS

(75) Inventor: Tom Nuydens, Vosselaar (BE)

(73) Assignee: Luciad, Leuven (BE)

( * ) Notice: Subject to any disclaimer, the term of this patent is extended or adjusted under 35 U.S.C. 154(b) by 1152 days.

(21) Appl. No.: 12/648,109

(22) Filed: Dec. 28, 2009

(65) Prior Publication Data
US 2010/0182323 A1 Jul. 22, 2010

(30) Foreign Application Priority Data

Jan. 16, 2009 (EP) ..................................... 09150799

(51) Int. Cl.
| | |
|---|---|
| *G06T 17/00* | (2006.01) |
| *G06T 15/30* | (2011.01) |
| *G09G 5/00* | (2006.01) |
| *G06T 17/20* | (2006.01) |
| *G06T 15/04* | (2011.01) |

(52) U.S. Cl.
CPC ................. *G06T 17/20* (2013.01); *G06T 15/04* (2013.01)
USPC ........... 345/418; 345/423; 345/428; 345/581; 345/587; 345/620

(58) Field of Classification Search
USPC ......... 345/418, 423, 581–582, 587–589, 428, 345/619–620, 501, 552; 358/524; 382/276, 382/285, 293, 295, 298–300, 302
See application file for complete search history.

(56) References Cited

U.S. PATENT DOCUMENTS

| | | | |
|---|---|---|---|
| 6,373,482 B1* | 4/2002 | Migdel et al. ................. | 345/419 |
| 6,618,053 B1* | 9/2003 | Tanner .......................... | 345/552 |
| 6,744,442 B1 | 6/2004 | Chan | |
| 6,891,546 B1 | 5/2005 | Park | |
| 6,924,814 B1 | 8/2005 | Ephanov | |
| 7,626,591 B2 | 12/2009 | Crawfis | |
| 2002/0118202 A1* | 8/2002 | Baldwin ....................... | 345/530 |
| 2002/0130886 A1* | 9/2002 | Baldwin ....................... | 345/611 |
| 2004/0233219 A1* | 11/2004 | Aguera y Arcas ............ | 345/606 |
| 2005/0088450 A1* | 4/2005 | Chalfin et al. ................. | 345/552 |

(Continued)

FOREIGN PATENT DOCUMENTS

WO 9717676 A1 5/1997

OTHER PUBLICATIONS

Asirvathan A. et al., "Terrain Rendering Using GPU-Based Geometry Clipmaps", GPU GEMS, Addison-Wesley, US, Jan. 1, 2004, pp. 27-45, XP002527139.

(Continued)

*Primary Examiner* — Wesner Sajous
(74) *Attorney, Agent, or Firm* — Bacon & Thomas, PLLC

(57) ABSTRACT

The present invention relates to a computer-readable data storage medium comprising a graphic dataset in the form of a tiled mipmap 101, and to a method of extracting from said computer-readable data storage medium to a computer memory a subset of said mipmap 101 in the form of a clipmap 109. The present invention relates also to a computer memory containing such a clipmap 109, as well as to a method of rendering said clipmap 109 in a computer system. At each level of detail of the mipmap but the lowest, a tile block 105 formed by a discrete plurality of tiles 104 is coextensive with a whole single tile 104 at the next lower level of detail of the tiled mipmap 101.

5 Claims, 9 Drawing Sheets

(56) References Cited

U.S. PATENT DOCUMENTS

2005/0253843 A1* 11/2005 Petterson et al. ............. 345/428
2007/0171234 A1* 7/2007 Crawfis et al. ................ 345/587
2011/0304608 A1* 12/2011 Yang ............................. 345/419

OTHER PUBLICATIONS

Montrym J.S. et al., "Infinite Reality: A Real-Time Graphics System", Computer Graphics Proceedings, SIGGRAPH 97, Los Angeles, Aug. 3-8, 1997; [Computer Graphics Proceedings, SIGGRAPH], Readings, Addison Wesley, US, Aug. 3, 1997, pp. 293-302, XP000765828, ISBN: 978-0-201-32220-0.

Search Report of European Patent Office regarding European Patent Application No. EP 09 15 0799, Jun. 18, 2009.

Tanner, Christopher C: Migdal, Christopher J.; Jones, Michael T., "The Clipmap: A Virtual Mipmap", Proceedings of the 25th Annual Conference on Computer Graphics and Interactive Techniques, 1998.

Losasso, Frank; Hoppe, Hugues, "Geometry Clipmaps: Terrain Rendering Using Nested Regular Grids", International Conference on Computer Graphics and Interactive Techniques, ACM SIGGRAPH 2004 Papers, pp. 769-776.

\* cited by examiner

PRIOR ART

PRIOR ART

METHOD FOR UNIFIED VISUALISATION OF HETEROGENEOUS DATASETS

TECHNICAL FIELD

The present invention relates to a computer-readable data storage medium comprising a graphic dataset in the form of a mipmap, and to a method of extracting from said computer-readable data storage medium to a computer memory a subset of said mipmap in the form of a clipmap. The present invention relates also to a computer memory containing such a clipmap, as well as to a method of rendering said clipmap in a computer system.

BACKGROUND OF THE INVENTION

A number of computer graphics applications such as, for example, flight simulators, geographical information systems, navigation systems, etc. need to allow the representation of subsets of large graphic datasets on a display, with frequent updates. For instance, in a flight simulator, this allows a user to visualize terrain updated in real time from a large graphic terrain dataset as the user flies over the simulated terrain.

When the original graphic dataset has a very large size, this can require very intensive data processing. In order to reduce those requirements, a number of methods have been proposed. One such method is known as mipmapping. A mipmap (from the Latin "multum in parvo"—many in a small space) is a graphic dataset comprising a collection of multiple versions of the same image at multiple different levels of detail. To render the same image with a more distant viewpoint, or a smaller display size, a subset of graphic data to be rendered will be extracted from a lower mipmap level of detail, whereas to display a close-up, the subset will be extracted from a higher mipmap level of detail. A mipmap reduces the real-time data processing requirements, and helps prevent image aliasing.

However, when the highest level of detail is a very large image, such as, for instance, in a geographic information system, a map of the whole Earth at 1 m resolution, a mipmap will comprise an exceedingly large amount of data, which will require a large memory. Since, at a given cost, increased memory size normally means lower access speed, this is disadvantageous for those applications requiring rapid or even real-time updates.

STATE OF THE ART

Tanner et al., in "The Clipmap: A Virtual Mipmap", Proceedings of the 25th annual conference on Computer graphics and interactive techniques, 1998, proposed a more efficient method called clipped mipmapping, or clipmapping.

In the abovementioned paper, those image data were in the form of texture data only, which eventually could be projected onto a geometry, as disclosed for instance in U.S. Pat. No. 6,924,814 B1. However, to reduce the memory and data processing requirements, geometry clipmaps comprising vertex data have also been disclosed in the prior art, for instance in "Geometry Clipmaps: Terrain Rendering Using Nested Regular Grids", International Conference on Computer Graphics and Interactive Techniques, ACM SIGGRAPH 2004, Papers, p. 769-776.

To simplify the updating of the intermediate memory, it has been proposed, for instance in US Patent Application Publication 2007/0171234 A1, U.S. Pat. Nos. 6,891,546 B1, 6,924,814 B1 or 6,744,442 B1, to divide each mipmap level of detail into discrete tiles.

Such a clipmapping method can be used for graphic representations of virtual as well as real entities. Nevertheless, these prior art clipmapping methods and systems present a number of drawbacks. When combining tiles from different levels of detail, since the tile boundaries at different levels do not necessarily coincide, the tiles from different levels of detail will have to be cut and pasted to each other, increasing processing requirements and creating image continuity problems, for example, the so-called "popping" problem, when there is not a proper transition between areas rendered at different levels of detail, and also, when the graphic data comprise three-dimensional geometry data, vertical gaps between tiles at different levels of detail.

SUMMARY OF THE INVENTION

It is an object of the present invention to provide a mipmap which further reduces data processing requirements both for extracting a clipmap out of this mipmap and for subsequently rendering and displaying an image out of this clipmap. In an embodiment of the present invention, a mipmap comprises a series of graphic data arrays representing the same entity with levels of detail increasing from a lowest level of detail to a highest level of detail, wherein each graphic data array it is divided into tiles by a grid, and at each level of detail of the mipmap but the lowest, a tile block formed by a discrete plurality of tiles is coextensive with a whole single tile at the next lower level of detail of the mipmap.

By "computer-readable data storage medium", it is meant any computer-readable support containing digital data, including, but not restricted to, a solid state memory such as a random access memory, a flash memory, or a read-only memory, but also a magnetic data storage medium such as a hard disk drive or a magnetic tape, an optical data storage medium such as an optical disk, etc.

By "graphic data", it is meant digital data comprising visual and positional features of real and/or virtual entities in an at least three-dimensional space. Such graphic data may include, but are not necessarily restricted to, texture and/or geometric data.

By "rendering" it is meant the conversion of these graphic data into a two-dimensional pixel array for displaying a view of said real or virtual entities from a determined viewpoint in said at-least three-dimensional space.

By "coextensive" it is meant that it represents the same portion of the represented entity. For example, if the represented entity is geographic, a whole single tile at the N level of detail covers the same geographic area as a tile block formed by a discrete plurality of tiles at the N+1, level of detail. By this, clipmapping is simplified, since any tile at any level of detail can easily be located with respect to any other tile by level of detail and grid position. Moreover, since normally the system will process entire tiles with coincident boundaries, the processing requirements will be reduced and the transition between tiles of different levels of detail facilitated. Tile mosaics comprising tiles of several different levels of detail can thus easily be created by neatly nesting tiles of a higher level of detail between tiles of a lower level of detail. The clean transition between different levels of detail within such tile mosaics facilitates the prevention of "popping" effects, and, when the graphic data comprise three-dimensional geometry data, of vertical gaps: for instance, each tile may be provided with vertical curtains along its edges, thus closing any such gaps.

It is a further object of the present application to provide with increased rendering precision without having to increase the coordinate range. When rendering small features of a large image dataset, the coordinates used to represent those features need both high precision and a large range, which sets very high requirements for the graphics hardware. In particular, single-precision floating point coordinates, as conventionally used in commodity graphics processors, may be insufficient.

Advantageously, the graphic data within each tile may thus comprise position coordinates within a coordinate system local to the tile. To locate any graphic feature within a tile, the local tile coordinates of that graphic feature can be combined with the grid position of the tile and its level of detail to obtain its global position. Rendering clipmaps extracted from such mipmaps is also facilitated by the use of local tile coordinates. Since in a clipmap the clip regions at the highest levels of detail cover only areas closest to the viewpoint, calculating the relative position of the viewpoint with respect to graphic features in those clip regions in local tile coordinates will require a narrower range than in global coordinates, while maintaining a high precision.

It is a further object of the present invention to provide a mipmap which can be stored in a more reduced data storage space. Advantageously, graphic data arrays within a series forming a mipmap may be sparsely populated with tiles.

For instance, at the highest levels of detail, only areas of particular interest may be populated with tiles.

It must also be noted that at least some tiles may comprise data other than texture and/or geometry data, such as, for instance, 3D representations of geographic features other than relief and texture, e.g. buildings, roads, vegetation, 2D or 3D raster data, e.g. weather data, or even non-visual data, e.g. textual information, a uniform resource identifier, etc.

As texture data, a tile may contain a bitmap image, for instance in the form of a 128×128 pixel array. The image may be encoded on disk in any graphics exchange format such as JPEG, PNG or TIFF and may be loaded into video memory when the tile is needed for rendering.

As geometry data, a tile may contain an array of graphical primitives, such as points, lines, or polygons. The primitives may be defined by vertices with 2D or 3D coordinates. For instance, the geometry data within a tile may be in the form of a regularly gridded triangle mesh of 16×16 vertices. The vertices may optionally have additional attributes such as texture coordinates, colours or normal vectors. The primitives may cross the boundaries of the tile provided that there is an unambiguous way to assign a primitive to a tile on each detail level. If this constraint were not in place, a single primitive might be assigned to multiple tiles and could consequently be rendered more than once.

A tile may also contain other types of data such as video, audio or text.

It is a further object of the present invention to ensure a smooth transition between levels of detail. To this object, the tile blocks may be square tile arrays, in particular 2×2 tile arrays. In particular with a 2×2 tile array, an excessive jump in detail between adjacent levels of detail is prevented. It must be however be noted that in alternative embodiments of the present invention, in at least one mipmap level of the detail, each tile may be coextensive with a square array of more than 2×2 tiles, or with a non-square array, or even with a more than two-dimensional, square or non-square tile array. For instance, for data with a high degree of complexity along the vertical axis, it may be useful for the graphic data array at at least one level of detail to be a three-dimensional array of tiles.

It is a further object of the present invention to ensure the correct positioning of graphic data with minimum data processing requirements. To this object, each tile may comprise a tile position index indicating its position within the grid at its level of detail.

It is a further object of the present invention to provide a smaller subset of the graphic data within said mipmap to allow rendering of graphic data from the mipmap from a smaller computer memory with faster access. To this object, an embodiment of the present invention also comprises a method of extracting, from the abovementioned computer-readable data storage medium to a computer memory using an electronic data processor, a subset of the graphic data of said mipmap in the form of a clipmap, wherein said method comprises the steps of:

at each level of detail up to and including a highest clipmap level of detail equal or lower than the highest mipmap level of detail, clipping from the mipmap a clip region not larger than a predetermined maximum clip region size, comprising a discrete number of tiles, and centred around a grid intersection closest to a current viewpoint or line of sight; and storing said clip regions in said computer memory to form said clipmap.

By "computer memory" it is meant any computer-readable and -writeable data storage medium, including, but not restricted to, a solid state memory such as a random access memory or a flash memory, but also a magnetic data storage medium such as a hard disk drive or a magnetic tape, an optical data storage medium such as an optical disk, etc.

The resulting clipmap can thus be cached in a computer memory having a significantly smaller capacity, and thus normally a shorter access time, than said computer-readable data-storage medium.

It is a further object of the present invention to ensure a fast update of the clipmap as the viewpoint moves. Advantageously, the clipmap extraction method may further comprise a step of updating each clip region after said viewpoint changes by replacing, in said intermediate memory, the least recently used tiles of each clip region with those tiles entering the clip region. By executing this updating tilewise, instead of individually for each position in the mipmap graphic data arrays, fewer updates are required and reducing the data processing requirements for fast updates. Even if this is achieved at the cost of a larger granularity, the clipmap structure ensures that this granularity remains substantially unnoticed by the user.

Advantageously, said computer-readable data storage medium may be a remote computer-readable data storage medium connected with said computer memory over a communication network. Said communication network may be a local area network, or a wide area network. It may be an Internet Protocol-based network, such as the Internet itself, allowing a robust communication connection to the remote computer-readable data storage network, possibly worldwide. It may be over cables or at least partially wireless. Such a remote computer-readable data storage medium could thus be accessed from a plurality of locations, possibly simultaneously, and thus concentrate the large amount of graphic data required for the mipmap into a single computer-readable data storage medium for a plurality of users.

The present invention relates also to a computer memory containing a clipmap, which may be extracted from a tiled mipmap using the abovementioned method, or directly generated tile-by-tile.

It is a further object of the present invention to provide a clipmap easily accessible from a core processor and/or a graphics processor of a computer for constructing a tile mosaic for rendering. Advantageously, the computer memory may be a system memory, that is, the main memory of a computer, directly linked to the computer's core processor.

It is a further object of the present invention to provide a rendering method quickly and efficiently providing a display image starting from a tiled clipmap. An embodiment of the invention comprises a method for rendering a clipmap with the steps of:

building up a tile mosaic, starting from the clip region with the lowest level of detail, by recursively:
checking, for each tile of the clip region, whether the clip region with the next level of detail includes all of the corresponding discrete plurality of tiles; and
if this check is positive, repeat it at the next level of detail;
if this check is negative and the tile contains valid graphic data, render the graphic data of the tile.

Thus, since in a clipmap the clip regions at the highest levels of detail cover only areas closest to the viewpoint, calculating the relative position of the viewpoint with respect to graphic features in those clip regions in local tile coordinates will require a narrower range than in global coordinates, while maintaining a high precision. It will become possible to perform this rendering method out-of-core, for instance in a commodity specialised graphics processor.

Once the rendering method is carried out, the resulting pixel array may be visually displayed through a display unit, such as, for example, a cathode ray tube, an LCD screen or projector, a plasma screen, a LED display unit, an OLED display unit, or any other suitable device for displaying a pixel array as a visible image.

BRIEF DESCRIPTION OF THE DRAWINGS

A particular embodiment of the invention will now be described in an illustrative, but not restrictive form, with reference to the following figures.

DETAILED DESCRIPTION OF THE INVENTION

Figure 1:
FIG. 1 shows a schematic view of a prior art mipmap.
Figure 1:
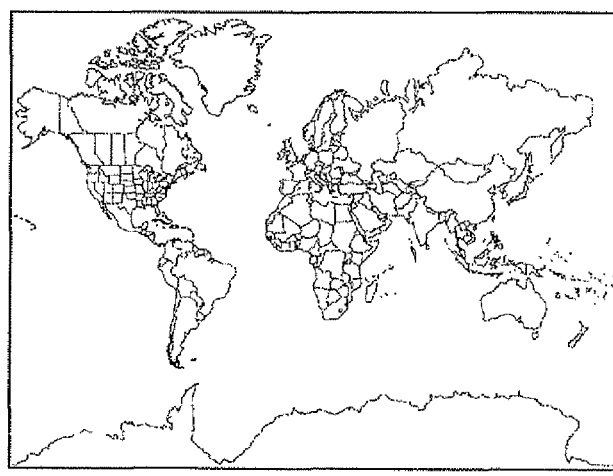
Figure 1:
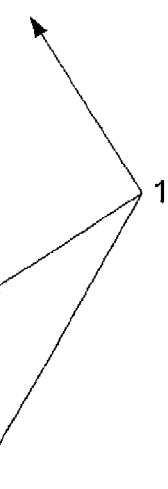
Figure 1:
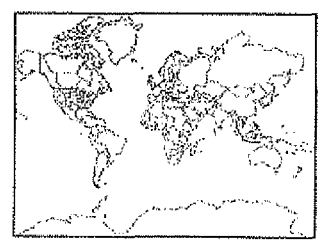
Figure 1:
Figure 1:
Figure 2:
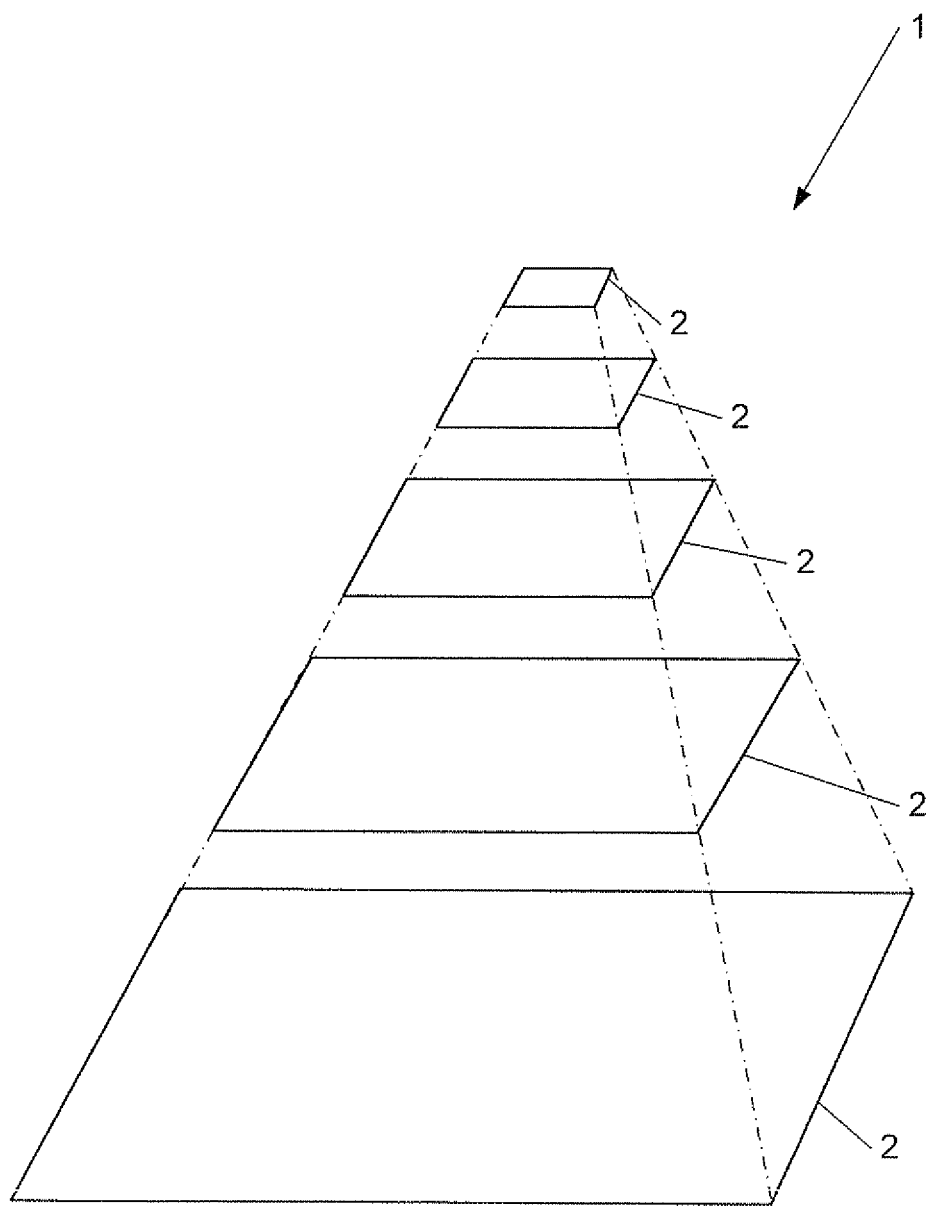
FIG. 2 shows another schematic view of the same prior art mipmap.

A prior art mipmap is illustrated by FIG. 1. Such a mipmap 1 comprises a series of several graphic data arrays 2 which represent the same entity at increasing levels of detail. Because of the increasing level of detail, the size of the graphic data arrays 2 also increase, so that, stacked, they can be represented as a pyramid, as in FIG. 2. In order to render and visually display part of the entity in a display unit of a given screen size and resolution, a data processor can thus extract the graphic data from the level of detail most adequate for fitting that part of the entity to the given screen size and resolution.

However, when a very large entity has to be represented even at a very high level of detail, such a complete mipmap will demand very significant resources. For instance, a whole-Earth geographic texture map with a 1m resolution will require a texture size of $2^{26}$ texels. Direct processing of such a texture size is already well beyond the possibilities of current home computers. If, besides texture, a geographical information system has to represent additional data, such as relief data, specific geographical features, etc. the hardware requirements are pushed even further.

Figure 3:
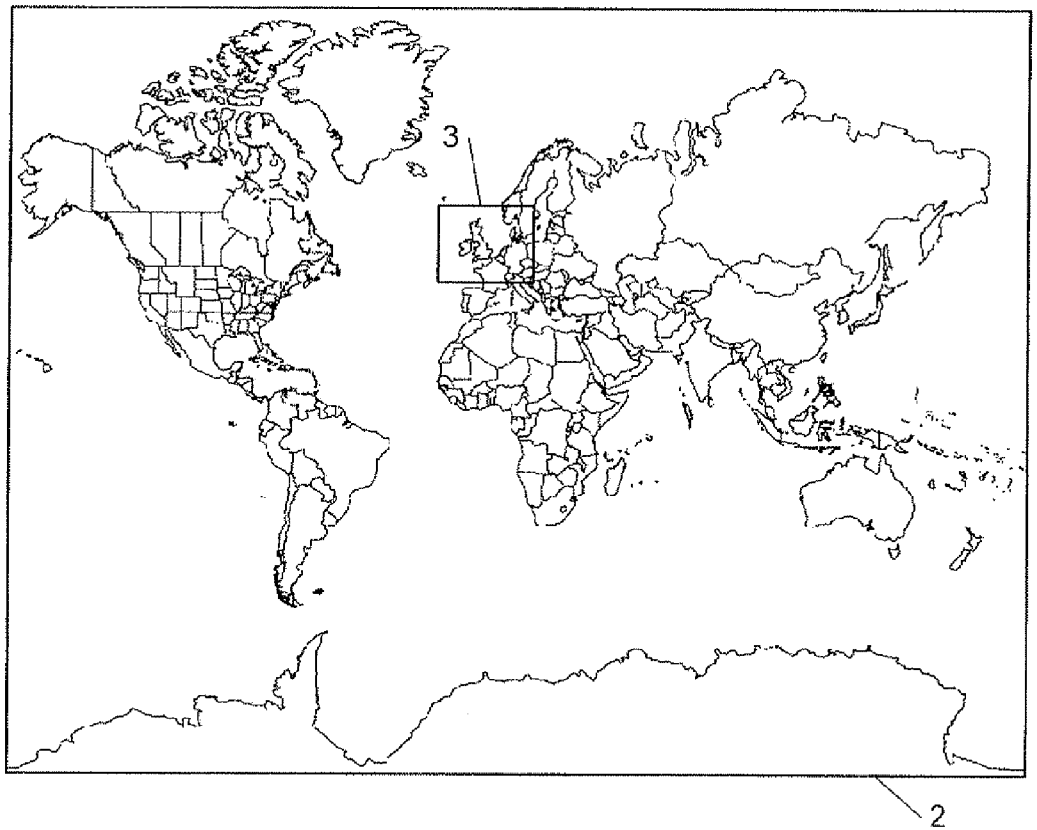
FIG. 3 shows how a clip region is selected at a given level of detail of said prior art mipmap in a prior art clipmapping method.
Figure 3:
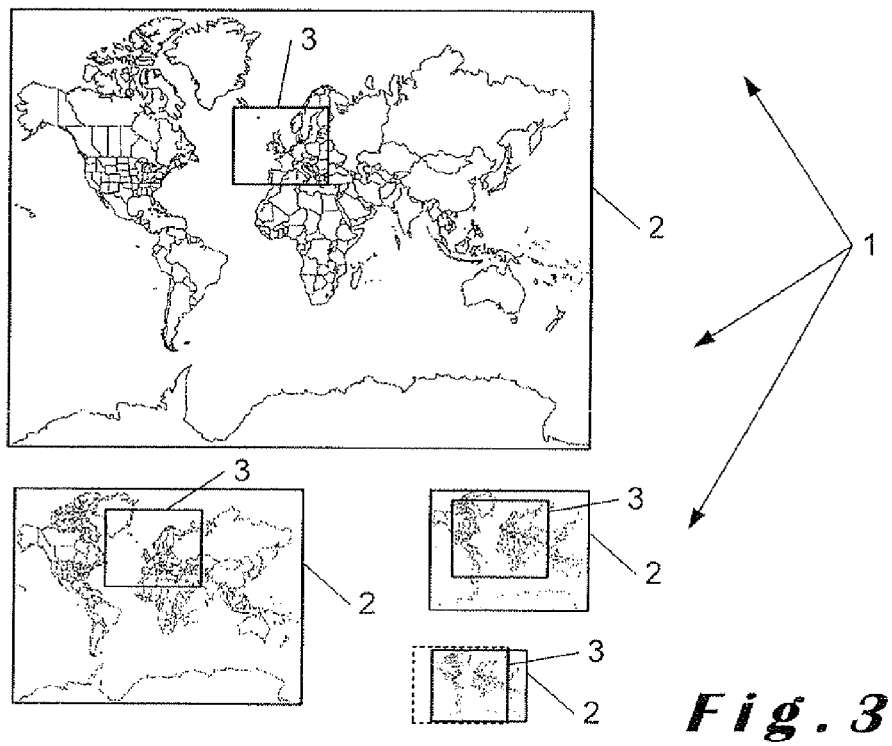
Figure 4:
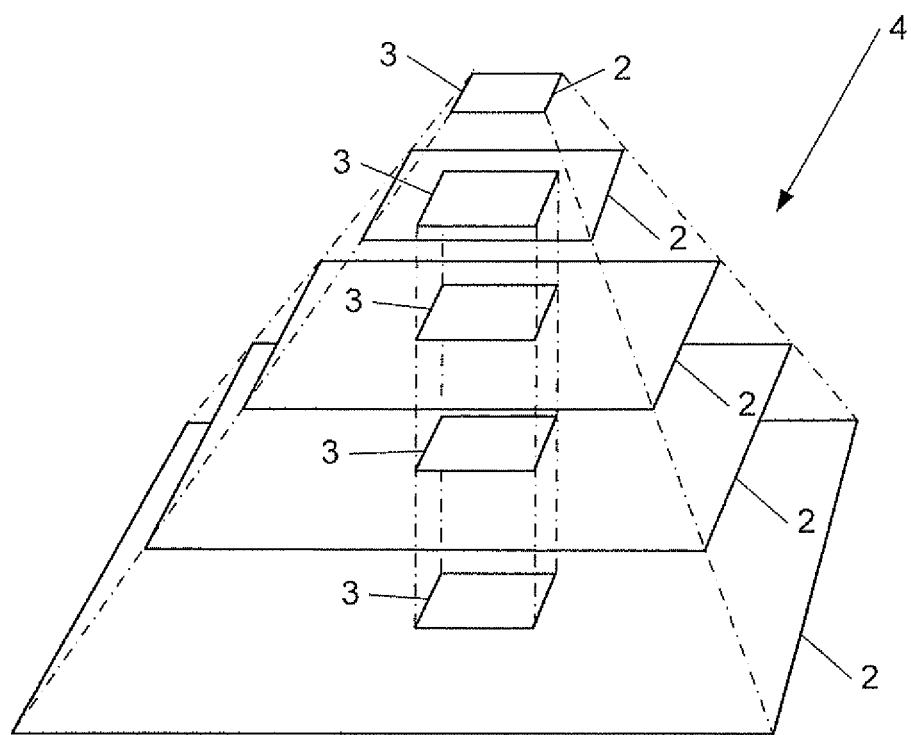
FIG. 4 shows a schematic view of a prior art clipmap.
Figure 5:
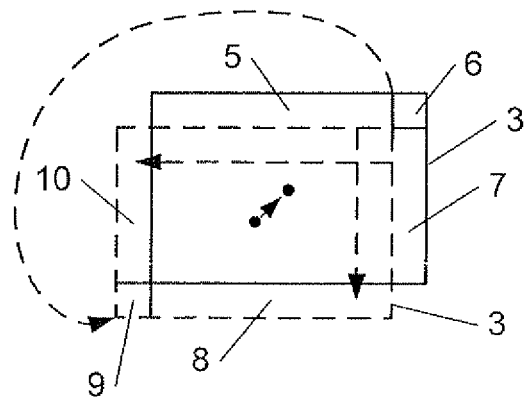
FIG. 5 shows a schematic view of a prior art toroidal updating method.

Clipmapping allows a partial reduction of the computer requirements for rendering part of an entity represented by a mipmap. Starting from the proposition that, at the highest levels of detail, only a small portion of the graphic data array 2 at that level will fit in a given display, the clipmapping method clips from each level a clip region 3 around the current viewpoint defining an area of interest equal or slightly larger than the display size, as shown in FIG. 3. At levels for which this area of interest is larger than the entire image, the whole image is selected. A "clipmap" 4 comprising the stack of all clip regions 3, schematically illustrated in FIG. 4, can thus be cached in a smaller, but faster access computer memory than the whole mipmap 1. If the viewpoint moves, the clip regions in the clipmap 4 are toroidally updated, that is, graphic data of areas 5, 6, 7 entering each clip region 3 replace in said cache the graphic data of areas 8, 9, 10 leaving the clip region, as illustrated in FIG. 5.

Figure 6:
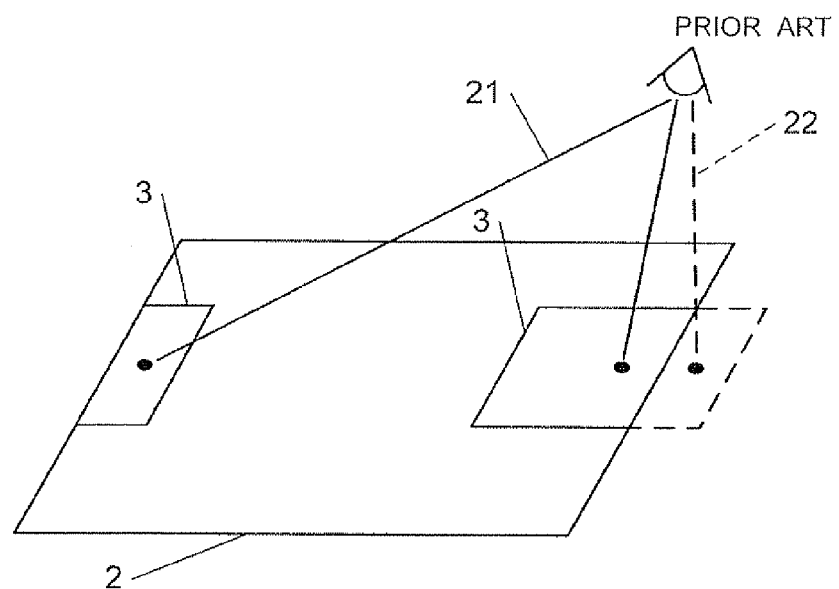
FIG. 6 shows a schematic view of a prior art mipmap level of detail wherein the viewpoint straddles the dateline.

However, prior art clipmaps still require a significant amount of memory and data processing speed. Moreover, in applications in which the large graphic dataset represents a wraparound image, such as for instance geographical applications, when the clip region straddles the so-called "dateline", that is, covers two opposite extremes of a graphic data array of a given level of detail of a mipmap, as illustrated in FIG. 6, correct rendering of the image portions at both sides is complicated when global coordinates are used for both graphic data and viewpoint. For instance, image portions across the dateline with respect to the viewpoint may be rendered with an erroneous line-of-sight 21, as also illustrated in FIG. 6. Instead of the correct line-of-sight 22, the data processor may erroneously identify line-of-sight 21 as the direct line between the viewpoint and the rendered area in global coordinates.

In a preferred embodiment of the present invention, a mipmap 101 comprises texture data, but also 3D geometric data in the form of a vertex grid. This mipmap 101 may also comprise 3D models of particular geographical features such as, for example, buildings, roads, tracks, vegetation, etc., as well as, eventually, additional textual, numerical, aural and/or visual information, such as, for example descriptive texts, uniform resource indicators, statistics, graphs, music, etc.

Like mipmaps of the prior art, this mipmap 101 is formed by graphic data arrays 102 representing a geographic area, such as, for instance, the entire surface of the Earth, at several different levels of detail. In this particular embodiment, the linear resolution of the texture and geometric data increases by a factor of two from a graphic data array 102 at one level of detail to the graphic data array 102 at the next level of detail. In alternative embodiments of the invention, however, the increase in the resolution from one level of detail to the next may differ.

Figure 7:
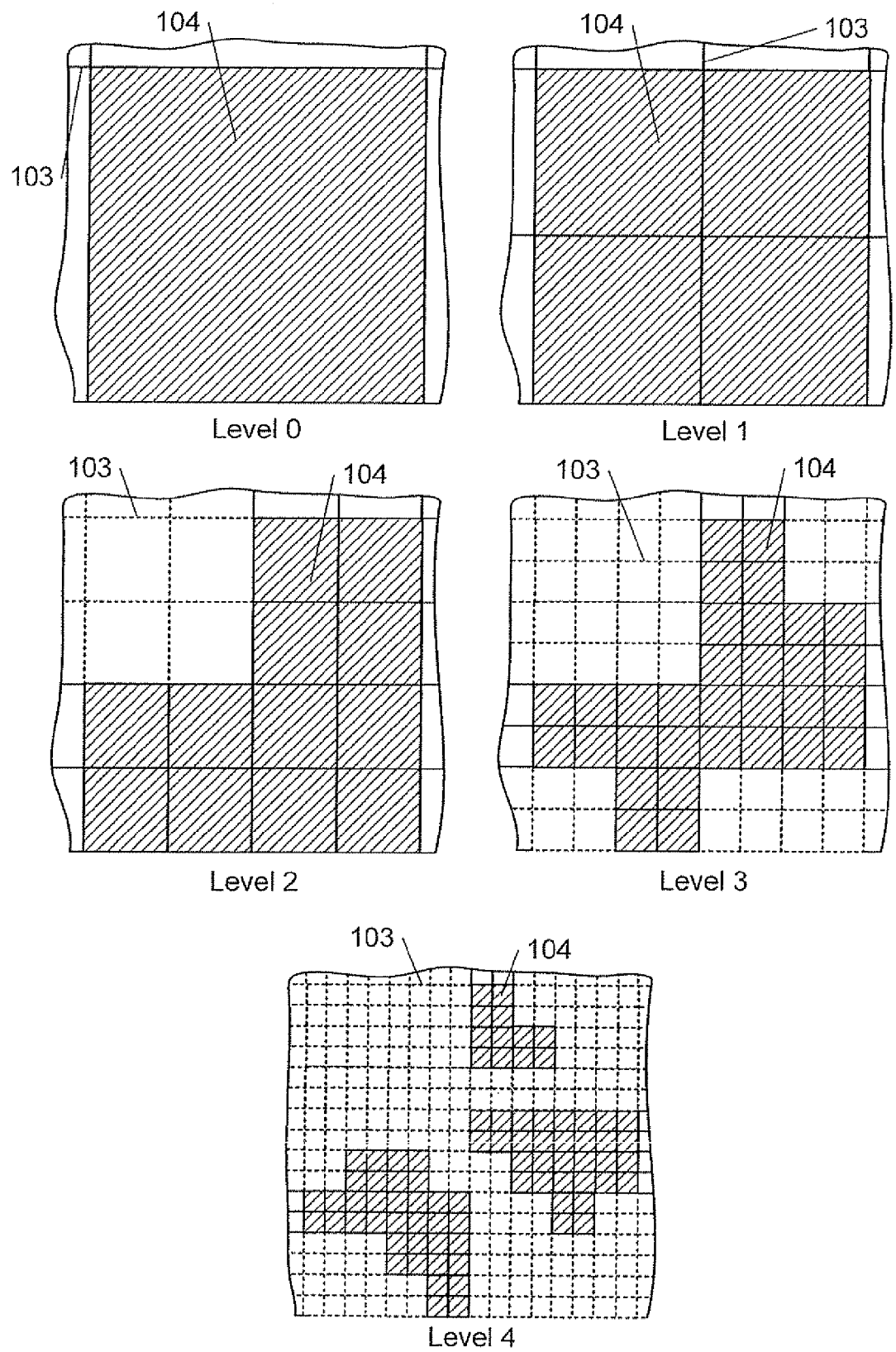
FIG. 7 shows a partial view of a tiled mipmap according to an embodiment of the present invention.

Each graphic data array 102 is divided by a grid 103 into tiles 104. As illustrated in FIG. 7, at each level of detail, the grid 103 is subdivided with respect to the next lower level of detail, so that, in this particular embodiment, a 2×2 block of tiles at a given level of detail (but the lowest) is coextensive with a whole single tile 104 at the next lower level of detail of the mipmap 101, representing the same area of the Earth. Therefore, since the linear resolution also increases by a factor of two, each tile 104 at any level of detail comprises approximately the same amount of data.

In the illustrated embodiment, each tile 104 comprises a 128×128 texel array for the texture, and a regularly gridded triangle mesh of 16×16 vertices for the geometry. The data for each vertex comprises its position in three-dimensional coordinates, two-dimensional texture coordinates for mapping the texture onto the geometry, and a normal vector in three-dimensional coordinates which may be used to apply shading to the terrain. All these coordinates are relative to a local tile coordinate system. These geometry data may be stored in a raw binary format, but also compressed so as to reduce data storage requirements.

The tiles 104 also comprise indexing information to assist in their efficient retrieval. This indexing information comprises level, row, and column indices, and forms a unique tile ID for each tile. The tiled mipmap 101 can thus be stored in a database as a "tileset".

As also illustrated in FIG. 7, the graphic data arrays 102 at at the higher levels of detail, are sparsely populated. For example, at levels 2 to 4, the the grid 103 is empty in the space coextensive with the tile located in the first row and first column position of level 1. At level 3, the tile grid 103 is also empty in the spaces coextensive with the tiles, which, in level 2, occupy the fourth row, first column position, first row, fourth column position, third row, fourth column position, and fourth row, fourth column position. At level 4, the tile grid 103 is empty in even more spaces. It is possible in this manner to substantially reduce the data storage space required for mipmap 101, by only storing particular areas of interest at the highest levels of detail.

Sparsely populating the tiled mipmap 101 allows a very significant reduction in the total amount of data to be stored. If the mipmap 101 has 20 levels of detail, and the lowest level of detail ("Level 0") has a 4×2 tile grid 103, the highest level of detail will have 2,097,152×1,048,576 tile positions, that is, 2,199,023,255,552 tile positions. If each tile position was populated, even if each tile could be represented by only one byte of data, just the highest level of detail would require 2 TB of data storage space. Populating the highest levels of detail with tiles only where such detail is desired can reduce this requirement significantly.

Figure 8:
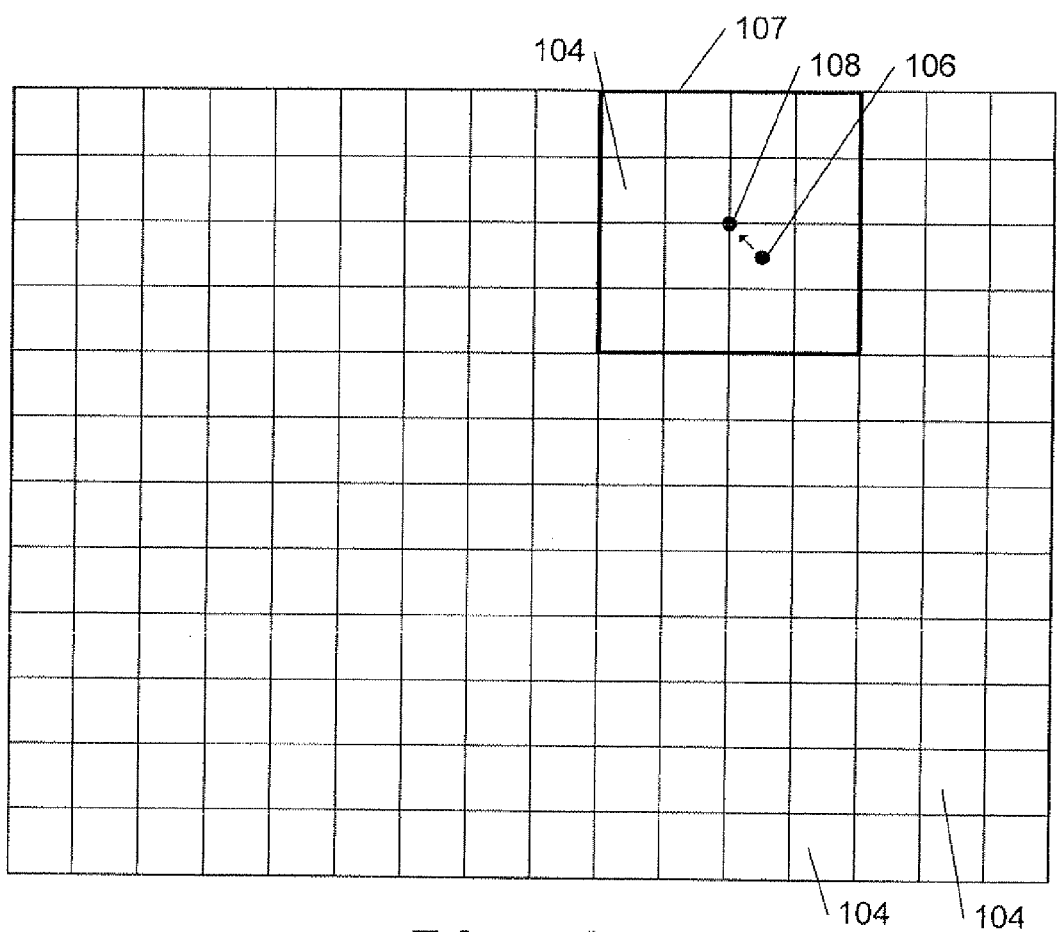
FIG. 8 shows how a tiled clip region is selected at a given level of detail from the tiled mipmap of FIG. 7 according to an embodiment of the present invention.

Turning now to FIG. 8, with a viewpoint 106, a clip region 107 is selected from a graphic data array 102 at each level of detail by first locating the grid intersection 108 closest to the viewpoint 106 or to a central line-of-sight from the viewpoint 106 (that is, closest to the centre of the display when the clip region 107 is rendered). Having set a maximum clip region size, which, in the illustrated embodiment is of 4×4 tiles, a clip region 107 of that size, centered on the intersection 108, is then selected, and the corresponding tiles within that clip region 107 are clipped from the mipmap 101. If, however, the maximum clip region size is, at that level of detail, larger than the graphic data array 102, only the tiles within the intersection of the graphic data array 102 and the theoretical clip region of maximum clip region size centred on the grid intersection 108 will be clipped to the real clip region 107.

Starting from the lowest level of detail, the same operation is performed, clipping clip regions 107 of up to 4×4 tiles centred on the same grid intersection, but, as the area represented by each individual decreases with the level of detail, representing an increasingly smaller geographical area. This may be continued until a maximum clipmap level of detail, which may be lower than the maximum mipmap level of detail. In a geographical application, the maximum clipmap level of detail may be determined in function of the altitude of the viewpoint 106 with respect to the surface of the Earth. For example, the maximum clipmap level of detail may be the lowest level of detail which fulfils the equation A≥D*Q, wherein A is the altitude, D is a linear dimension of the geographic area covered by clip region 107, such as its diagonal, and Q a predetermined quality parameter.

When the graphic data array 102 is a "wrap-around" representation, such as a plane map of the Earth, wherein opposite edges of the graphic data array 102 actually correspond to adjacent areas of the represented entity, and the clip region 107 actually straddles the "dateline" formed by those edges, simple modulo arithmetic is used to retrieve the tiles at the other side of this dateline. If, for example, the graphic data array 102 is 256, tiles wide, with columns numbered #0, to #255, and the left edge of a 4×4 clip region is in column #253, then tiles from columns #256, and #257 will be requested. In that case, since the maximum column number is #255, a MOD 256 operation will be carried out on these column position indices, and tiles from columns #0, (that is, 256 MOD 256) and #1 (that is, 257 MOD 256) retrieved instead.

Once the tile positions covered by a clip region 107 are determined, the tiles within said tile region in the tiled mipmap are requested using their tile IDs. The query is preferably performed asynchronously, using one or more separate execution threads. If a requested tile exists, that is, if the position corresponding to that tile ID is populated in the tiled mipmap, it is retrieved and stored in the clip region 107. For this purpose, a list of the tile IDs of tiles which have already been requested, but not yet received is maintained. This list is handled in a First-In-First-Out (FIFO) manner. Whenever a tile is requested from the tiled mipmap, its tile ID is added to this pending requests list, and whenever a tile is received from the tiled mipmap, its tile ID is removed from this pending requests list.

To further optimize the process, a list of tile IDs of unavailable tiles is also maintained. If a tile is requested from the tiled mipmap, but turns out not to exist, because that tile position is not populated in the tiled mipmap, its tile ID is added to the list. To avoid excessive memory consumption, the length of this list is limited: if the limit is reached, old entries are removed to make room for new ones.

Figure 9:
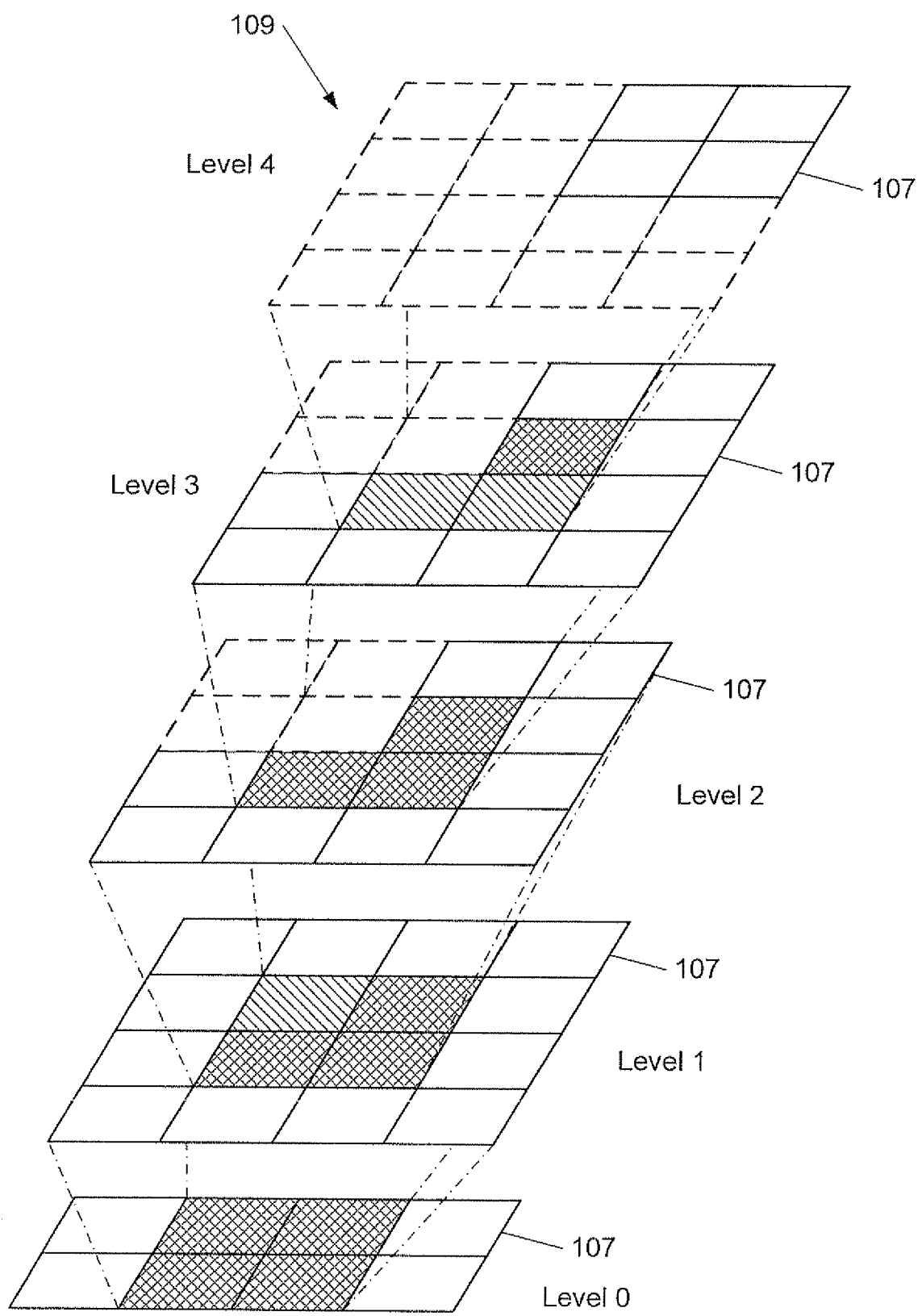
FIG. 9 shows a schematic view of the resulting tiled clipmap according to an embodiment of the present invention.

FIG. 9 illustrates an example of a tiled clipmap 109 extracted from a sparsely populated tiled mipmap 101 using this method with a viewpoint located over the center of the represented entity. At the lowest level of detail, the graphic data array 102, with 4×2 tiles, is smaller than the maximum clip region size of 4×4 tiles, and is thus included complete in the clip region 107. At the next level of detail, all 4×4 tile positions around the viewpoint are populated, and thus all 16 tiles are included in the clip region 107. At level 2, however, the positions of a 2×2 tile block are not populated in the mipmap 101, and are thus also left empty in the clipmap 109. The same is repeated at level 3. Finally, at level 4, only a single 2×2 tile block populates the tile grid around the viewpoint within the maximum clip region size. Only that single 2×2 tile block will thus be included in the clipmap 109 at level 4.

Figure 10:
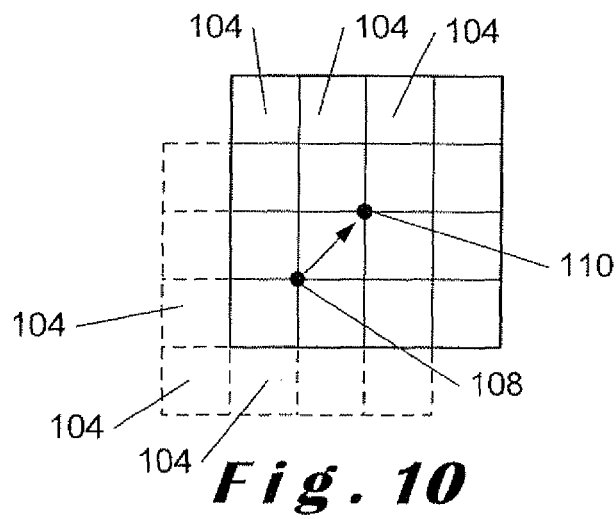
FIG. 10 shows a schematic view of a toroidal updating method according to an embodiment of the present invention.

The clipmap 109 can then be stored in a significantly smaller memory space than the entire mipmap 101. To update each clip region 107 when the viewpoint 106 moves, the clip region 107 is only updated when the viewpoint 106 comes closer to another grid intersection 110, as illustrated in FIG. 10. Whole tiles 104 entering the clip region 107 then replace the least recently used tiles 104 within the clip region 107. For this, tiles will be requested from the tiled mipmap 101 using the tile IDs within the maximum clip region size around the new viewpoint, excepting those tiles whose tile ID is already in the unavailable tile ID list. Because of the asynchronous nature of the tile retrieval process, it is possible that tiles are requested more rapidly than they can be retrieved. A typical scenario in which tiles may be requested at a higher rate than they can be retrieved is when the viewpoint or the line-of-sight move rapidly. In such a scenario, it is also possible that a tile is requested, but exits the clip region 107 again before the request reaches the front of the queue. For such scenarios, it is possible to cancel requests. Each tile ID in the pending requests list that is no longer inside the clip region is cancelled, thus avoiding the overhead of retrieving the tile when it is no longer to be used.

Although retrieving whole tiles increases the granularity of the updates, it reduces their frequency and thus the updating requirements. Since, with the finer grids of the higher levels of detail, the updates will be more frequent, the granularity also decreases with increasing levels of detail, so that it is less perceptible by the user.

Figure 11:
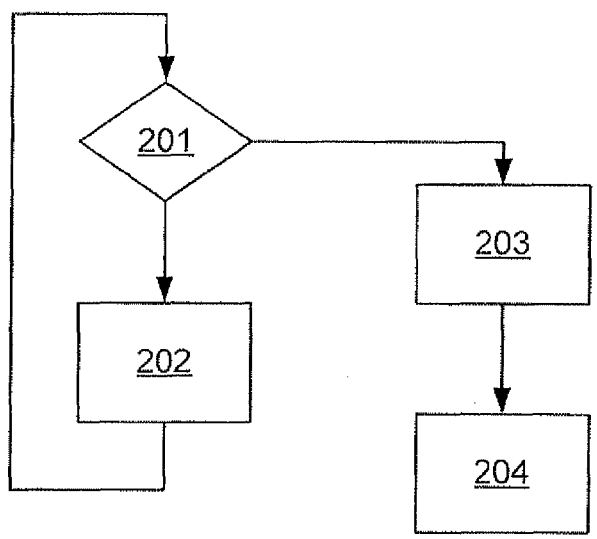
FIG. 11 shows a schematic flowchart of a rendering method according to an embodiment of the present invention.

FIG. 11 illustrates a flowchart of the process of rendering the tiled clipmap for display. Starting from the clip region at the lowest level of detail, in a first step 201 it is checked for each tile at that level of detail whether the clip region at the next higher level of detail contains a coextensive 2×2 block of tiles. If this is the case, the level of detail is increased by one in the next step 202, and the same check 201 is carried out again for each tile in said 2×2 block of tiles.

Figure 12:
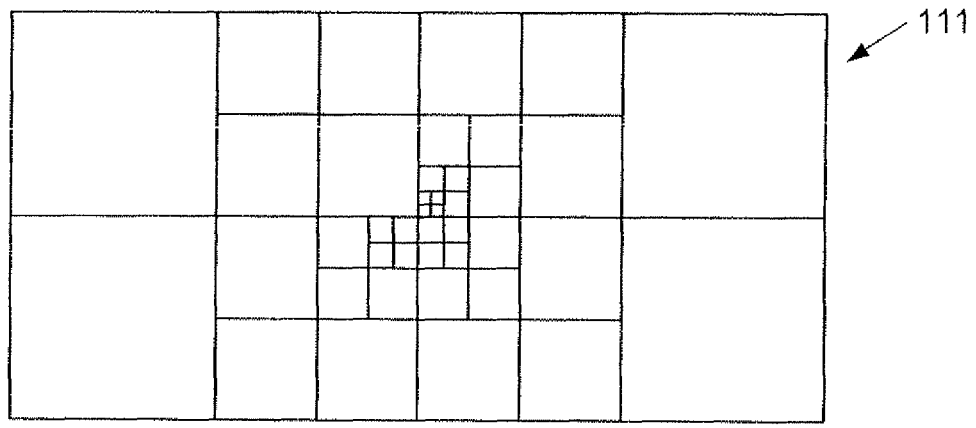
FIG. 12 shows a schematic view of a tile mosaic constructed using a rendering method according to an embodiment of the present invention.

FIG. 12 illustrates the tile mosaic 111 which will result of applying this process to the tiled clipmap of FIG. 9. In this tile mosaic 111, blocks of smaller, higher-definition tiles are successively nested between larger tiles where they are available.

Figure 13:
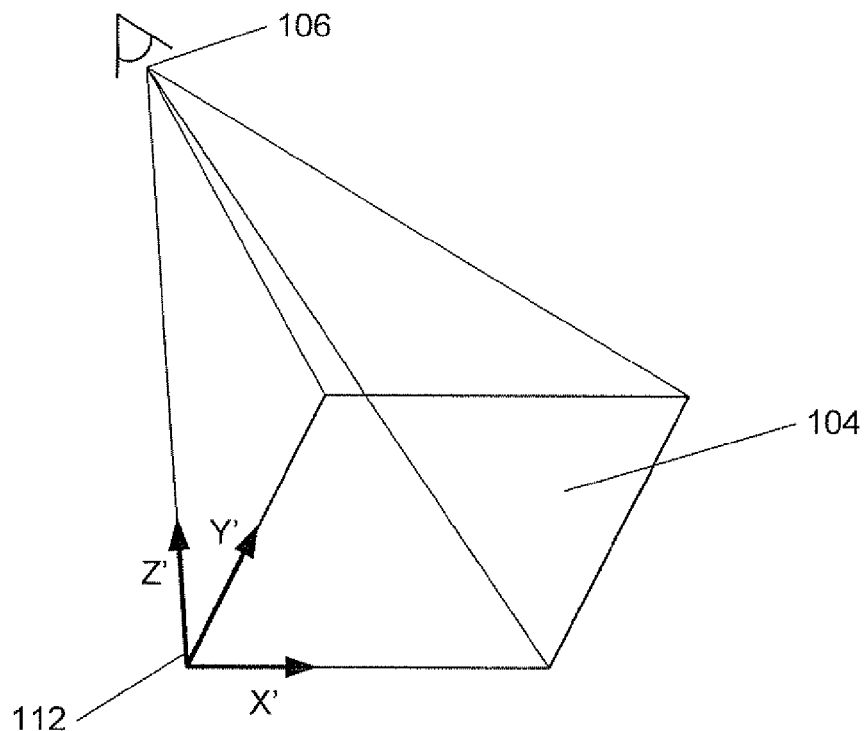
FIG. 13 shows how a view of the graphic data of an individual tile as seen from a given viewpoint are rendered with the rendering method according to an embodiment of the present invention.

When, however, the result of the check 201 for a given tile is negative, and no coextensive 2×2 block 105 of tiles 104 is found at the next higher level of tiles 104, if that given tile 104 comprises valid graphic data, these graphic data are rendered with the process shown in FIG. 13. The global coordinates of the viewpoint 106 with respect to the represented entity are converted, in step 203, into local coordinates in a coordinate system 112 local to each the 104 to be rendered. This conversion is straightforward, since the position of each tile 104 in the global coordinate system is easily determined by its tile ID. Since size and resolution of each tile 104 will be directly related to the distance of that tile 104 to the viewpoint 106, the local tile coordinate system 112 will be appropriate to locate both the viewpoint 106 and the visual features within the tile 104 with high relative precision without requiring a high range. Using this local coordinate system, drawing in step 204 the visual features of tile 104 as seen from viewpoint 106 will thus be possible with, for example, single-precision floating point coordinates as used by commodity graphics processors.

Single-precision (32-bit) floating point numbers give sub-millimeter accuracy near the origin, but give an accuracy no better than 3, or more meters when further away from the origin. This would not be enough to represent fine structures, such as powerlines or buildings across the whole earth if global coordinates were used for the graphic data.

64-bit double-precision floating point numbers allow positioning with sub-millimeter accuracy everywhere in a whole-Earth map. However, using double-precision floating point numbers for locating the graphic data contained in each tile 104 would require twice as much data storage space than single-precision floating point numbers, and overwhelm current off-the-shelf commodity graphics processors. In the illustrated embodiment the viewpoint is located in global coordinates using double precision floating point numbers, but the graphic data within each tile 104 are located using single-precision floating point numbers with respect to a coordinate system local to the tile. This ensures accurate positioning within the tile 104. By transforming the viewpoint to the local coordinate system of the tile 104 and rendering within that coordinate system, it is ensured that the high local accuracy within the tile 104 is maintained throughout the rendering visualization.

Figure 14:
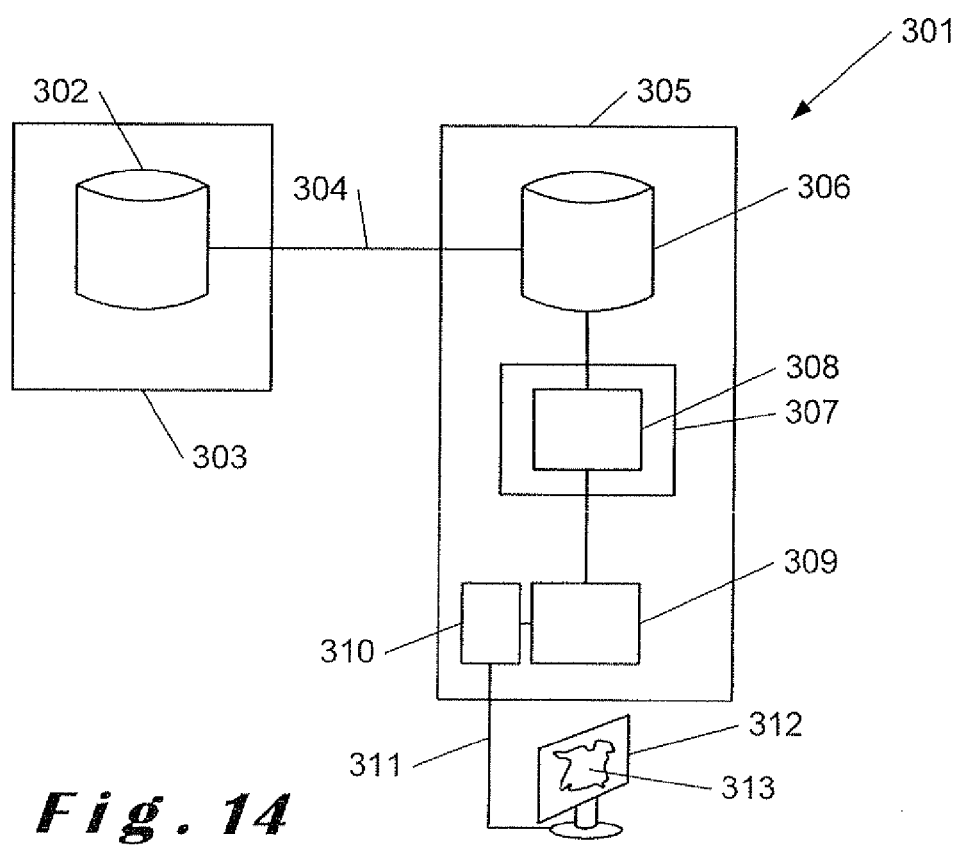
FIG. 14 shows a schematic view of an example of a computer system suitable for carrying out the clipmapping and rendering methods according to embodiments of the present invention.

FIG. 14 illustrates an embodiment of a computer system 301 for carrying out these clipmapping and rendering methods. The tiled mipmap is stored in a computer-readable data storage medium 302, which may be many terabytes in size, within a remote server 303 connected over a network 304 with one or several client computers 305. Said network 304 may be a local area network, or a wide area network. It may be an Internet Protocol-based network, such as the Internet itself, allowing a robust communication connection to the remote computer-readable data storage network, possibly world-wide. It may be over cables or at least partially wireless.

Tiles that can be expected to be required for the tiled clipmap in the medium term may be transmitted over said network 304 to be stored into a local disk storage cache 306 of the client computer 305 to minimise the impact of network latency. This local disk storage cache 306 may thus be much smaller than the computer-readable data storage medium 302 of the server 303, for example a few hundred megabytes to a few gigabytes. From this local disk storage cache 306, tiles forming the tiled clipmap are transmitted to the system memory 307 of the client computer 305. The tile textures may be stored in a compressed format, such as JPEG, in the computer-readable data storage medium 302 and local disk storage cache 306, and converted to a raw array of RGB color values when they are transmitted to the system memory 307. To increase the updating speed, a tile cache 308 within said system memory 307 may store not just the tiles corresponding to the current tiled clipmap, but also a number of tiles neighbouring each clip region of the tiled clipmap. For example, if the clip region comprises 8×8 tiles, the tile cache could comprise at any given time 100, tiles, comprising said 8×8 (64) tiles, plus 36 neighbouring tiles.

Finally, the tiles of the tile mosaic, that is, the tiles which may thus effectively be rendered, are stored in a graphics memory 309 connected to a graphics processor 310 with an output 311 to a display unit 312, such as, for example, a cathode ray tube, an LCD screen or projector, a plasma screen, a LED display unit, an OLED display unit, or any other suitable device for displaying a pixel array produced by said graphics processor 309 from said tile mosaic as a visible image 313.

Although the present invention has been described with reference to specific exemplary embodiments, it will be evident that various modifications and changes may be made to these embodiments without departing from the broader scope and spirit of the invention as set forth in the claims. For instance, the tiled mipmap could be hosted locally instead of in a remote server 303, or the tiles of the tiled mipmap could be generated on the fly using a variety of input data: for instance, terrain geometry may be generated directly from digital elevation data such as DEM or DMED, and terrain textures may be produced from digital raster formats such as GeoTIFF, MrSID or JPEG2000. Vector shapes may be partitioned into tiles rather than using a gridded data format such as for 3D terrain. Also, while the methods and systems of the invention have been described with reference to their application to a whole-Earth geographical information system, graphic data of other types of real or virtual entities could also processed in this way. Accordingly, the description and drawings are to be regarded in an illustrative sense rather than a restrictive sense.

The invention claimed is:

1. A method of rendering a clipmap with a computer system, using a viewpoint with a predetermined position and line of sight with respect to an entity represented at least partially in said clipmap, wherein:

the clipmap comprises a series of graphic data arrays in the form of clip regions representing at least part of a same entity with levels of detail increasing from a lowest clipmap level of detail to a highest clipmap level of detail, each clip region comprising a discrete number of tiles, not larger than a maximum clip region size, arranged in a tile grid, and centred around a grid intersection closest to said viewpoint or line of sight, and the tile grid of the clip region at each level of detail except for the lowest level of detail is a subdivision of the tile grid at a next lower level of detail, so that, at each level of detail except for the lowest level of detail, a tile block comprising a discrete plurality of tiles covers a same part of the represented entity as a whole single tile at the next lower level of detail; and the method comprising the steps of:

building up a tile mosaic, starting from the clip region with the lowest level of detail, by recursively:

checking, for each tile of the clip region, whether the clip region at the next level of detail includes the whole coextensive tile block; and if this check is positive, repeat it at the next level of detail up to the highest clipmap level of detail;

if this check is negative and the tile contains valid graphic data, render the graphic data of the tile.

2. The rendering method of claim 1, wherein, before the graphic data within a tile are rendered, the position of the viewpoint and the orientation of the line of sight are transformed into a local coordinate system of the tile, and the graphic data of the tile are rendered using said transformed viewpoint position and orientation.

3. A computer-readable data storage medium containing a computer program for carrying out a method of rendering a clipmap with a computer system, using a viewpoint with a predetermined position and line of sight with respect to an entity represented at least partially in said clipmap, wherein:

the clipmap comprises a series of graphic data arrays in the form of clip regions representing at least part of a same entity with levels of detail increasing from a lowest clipmap level of detail to a highest clipmap level of detail, each clip region comprising a discrete number of tiles, not larger than a maximum clip region size, arranged in a tile grid, and centred around a grid intersection closest to said viewpoint or line of sight, and the tile grid of the clip region at each level of detail except for the lowest level of detail is a subdivision of the tile grid at a next lower level of detail, so that, at each level of detail except for the lowest level of detail, a tile block comprising a discrete plurality of tiles covers a same part of the represented entity as a whole single tile at the next lower level of detail; and wherein when said computer program is executed by a processor and performs the method comprising the steps of:

building up a tile mosaic, starting from the clip region with the lowest level of detail, by recursively:

checking, for each tile of the clip region, whether the clip region at the next level of detail includes the whole coextensive tile block; and if this check is positive, repeat it at the next level of detail up to the highest clipmap level of detail;

if this check is negative and the tile contains valid graphic data, render the graphic data of the tile.

4. The rendering method of claim 1, wherein each graphic data array comprises geometry data.

5. The computer-readable data storage medium of claim 3, wherein each graphic data array comprises geometry data.

* * * * *